US 6,628,438 B1

(12) United States Patent
Chung

(10) Patent No.: US 6,628,438 B1
(45) Date of Patent: Sep. 30, 2003

(54) METHOD FOR COMPRESSING IMAGE DATA WITH FIXED RATE AND DEVICE THEREFOR

(75) Inventor: Tzu-Chiang Chung, Taipei (TW)

(73) Assignee: Benq Corporation, Taoyuan (TW)

( * ) Notice: Subject to any disclaimer, the term of this patent is extended or adjusted under 35 U.S.C. 154(b) by 639 days.

(21) Appl. No.: 09/587,905

(22) Filed: Jun. 6, 2000

(30) Foreign Application Priority Data

Jun. 15, 1999 (TW) .......................................... 88109969 A

(51) Int. Cl.⁷ ................................................. H04N 1/46
(52) U.S. Cl. ........................................ 358/539; 358/538
(58) Field of Search ................................. 358/538, 539; 382/167, 168, 169; 348/417.1, 418.1, 659, 14.13

(56) References Cited

U.S. PATENT DOCUMENTS 5,493,335 A * 2/1996 Parulski et al. .......... 348/231.6

* cited by examiner

*Primary Examiner*—Edward Coles
*Assistant Examiner*—Heather D Gibbs
(74) *Attorney, Agent, or Firm*—Rabin & Berdo, P.C.

(57) ABSTRACT

A method for compressing image data at a fixed rate and a device thereof is used for a scanning device capturing and generating image data. When the image data is scanned, the scanning areas of each color data are respectively selected to compress image data with a fixed rate. A decompression method is utilized which interpolates the decompressed data based on known color data in adjacent pixels.

62 Claims, 5 Drawing Sheets

| | | | | | | | |
|---|---|---|---|---|---|---|---|
| (2n−1)th row | R | X | 2 | X | 4 | X | 6 |
| | G | 1 | 2 | 3 | 4 | 5 | 6 |
| (2n)th row | G | 1 | 2 | 3 | 4 | 5 | 6 |
| | B | 1 | X | 3 | X | 5 | X |
| (2n+1)th row | R | X | 2 | X | 4 | X | 6 |
| | G | 1 | 2 | 3 | 4 | 5 | 6 |

|   | R | 1 | 2 | 3 | 4 | 5 | 6 |
|---|---|---|---|---|---|---|---|
| (2n-1)th row | G | 1 | 2 | 3 | 4 | 5 | 6 |
|   | B | 1 | 2 | 3 | 4 | 5 | 6 |

|   | R | 1 | 2 | 3 | 4 | 5 | 6 |
|---|---|---|---|---|---|---|---|
| (2n)th row | G | 1 | 2 | 3 | 4 | 5 | 6 |
|   | B | 1 | 2 | 3 | 4 | 5 | 6 |

FIG. 1A (PRIOR ART)

| R(2n-1,k)   | R(2n-1,k+1)   | R(2n-1,k+2)   |
|-------------|---------------|---------------|
| G(2n-1,k)   | G(2n-1,k+1)   | G(2n-1,k+2)   |
| B(2n-1,k)   | B(2n-1,k+1)   | B(2n-1,k+2)   |
| R(2n,k)     | R(2n,k+1)     | R(2n,k+2)     |
| G(2n,k)     | G(2n,k+1)     | G(2n,k+2)     |
| B(2n,k)     | B(2n,k+1)     | B(2n,k+2)     |
| R(2n+1,k)   | R(2n+1,k+1)   | R(2n+1,k+2)   |
| G(2n+1,k)   | G(2n+1,k+1)   | G(2n+1,k+2)   |
| B(2n+1,k)   | B(2n+1,k+1)   | B(2n+1,k+2)   |

FIG. 1B (PRIOR ART)

|   | | | | | | | |
|---|---|---|---|---|---|---|---|
| (2n-1)th row | R | X | 2 | X | 4 | X | 6 |
| | G | 1 | 2 | 3 | 4 | 5 | 6 |

|   | | | | | | | |
|---|---|---|---|---|---|---|---|
| (2n)th row | G | 1 | 2 | 3 | 4 | 5 | 6 |
| | B | 1 | X | 3 | X | 5 | X |

|   | | | | | | | |
|---|---|---|---|---|---|---|---|
| (2n+1)th row | R | X | 2 | X | 4 | X | 6 |
| | G | 1 | 2 | 3 | 4 | 5 | 6 |

FIG. 2A

| G(2n-1,2k) R(2n-1,2k) | G(2n-1,2k+1) | G(2n-1,2k+2) R(2n-1,2k+2) |
|---|---|---|
| G(2n,2k) | G(2n,2k+1) B(2n,2k+1) | G(2n,2k+2) |
| G(2n+1,2k) R(2n+1,2k) | G(2n+1,2k+1) | G(2n+1,2k+2) R(2n+1,2k+2) |

FIG. 2B

|   | | | | | | |
|---|---|---|---|---|---|---|
| R | X | 2 | X | 4 | X | 6 |
| G | 1 | 2 | 3 | 4 | 5 | 6 |
| B | 1 | X | 3 | X | 5 | X |

(2n-1)th row

|   | | | | | | |
|---|---|---|---|---|---|---|
| R | X | 2 | X | 4 | X | 6 |
| G | 1 | 2 | 3 | 4 | 5 | 6 |
| B | 1 | X | 3 | X | 5 | X |

(2n)th row

|   | | | | | | |
|---|---|---|---|---|---|---|
| R | X | 2 | X | 4 | X | 6 |
| G | 1 | 2 | 3 | 4 | 5 | 6 |
| B | 1 | X | 3 | X | 5 | X |

(2n+1)th row

FIG. 3A

| G(2n-1,2k-1)<br>B(2n-1,2k-1) | G(2n-1,2k)<br>R(2n-1,2k) | G(2n-1,2k+1)<br>B(2n-1,2k+1) |
|---|---|---|
| G(2n,2k-1)<br>B(2n,2k-1) | G(2n,2k)<br>R(2n,2k) | G(2n,2k+1)<br>B(2n,2k+1) |
| G(2n+1,2k-1)<br>B(2n+1,2k-1) | G(2n+1,2k)<br>R(2n+1,2k) | G(2n+1,2k+1)<br>B(2n+1,2k+1) |

FIG. 3B

|   |   | 1 | 2 | 3 | 4 | 5 | 6 |
|---|---|---|---|---|---|---|---|
| | R | 1 | 2 | 3 | 4 | 5 | 6 |
| (2n-1)th row | G | 1 | 2 | 3 | 4 | 5 | 6 |
| | B | X | X | X | X | X | X |
| | R | X | X | X | X | X | X |
| (2n)th row | G | 1 | 2 | 3 | 4 | 5 | 6 |
| | B | 1 | 2 | 3 | 4 | 5 | 6 |
| | R | 1 | 2 | 3 | 4 | 5 | 6 |
| (2n+1)th row | G | 1 | 2 | 3 | 4 | 5 | 6 |
| | B | X | X | X | X | X | X |

FIG. 6A

| G(2n-1,2k)<br>R(2n-1,2k) | G(2n-1,2k+1)<br>R(2n-1,2k+1) | G(2n-1,2k+2)<br>R(2n-1,2k+2) |
|---|---|---|
| G(2n,2k)<br>B(2n,2k) | G(2n,2k+1)<br>B(2n,2k+1) | G(2n,2k+2)<br>B(2n,2k+2) |
| G(2n+1,2k)<br>R(2n+1,2k) | G(2n+1,2k+1)<br>R(2n+1,2k+1) | G(2n+1,2k+2)<br>R(2n+1,2k+2) |

FIG. 6B

METHOD FOR COMPRESSING IMAGE DATA WITH FIXED RATE AND DEVICE THEREFOR

BACKGROUND OF THE INVENTION

This application incorporates by reference Taiwanese application Ser. No. 88109969, filed Jun. 15, 1999.

1. Field of the Invention

The invention relates in general to an image compression method and a device therefor, and more particularly to a method for compressing image data with a fixed rate and a device therefor.

2. Description of the Related Art

For current information technical staff, especially personal computer (PC) users, there has been developed a new multi-media mode. Data in a multi-media mode appears in text, audio, voice, etc. In order to function in a multi-media mode, many multi-media devices have been developed to capture image or sound.

Scanners and digital cameras are the most popular devices used to capture image data. A flatbed scanner, the most popular scanner, scans and converts documents into digital data during a scanning process. The digital data is received by PC for a further processing. Generally, a photo-electronic sensing module in the scanner includes a photo-electronic sensor. The photo-electronic sensor may be a charge-coupled device (CCD) or a contact image sensor (CIS).

Also, a multi-functional peripheral (MFP) has been developed, for performing multi-functions, e.g., fax, copying, scanning, etc. The MFP combines a fax machine, a copy machine, a scanner, etc. into one device in order to reduce space.

During the scanning process, the reflected light or the transmitted light, from an object to be scanned, is converted into analog signals by the photo-electronic sensor. Then, the analog signals are received through a control circuit by a host machine (e.g., a PC) for image processing.

As known, colored light is composed of green (G) light, red (R) light and blue (B) light. In the following statements, the components of the G light, the R light, and the B light of image data are respectively defined as G data, R data, and B data. The G data, R data, and B data are also collectively called color data.

In the scanning process, the photo-electronic sensing module captures the G data, the R data, and the B data for each pixel in a row of image data, and generates a corresponding analog signal. The analog signals are received by an analog-digital converter (ADC), to provide digital signals to a next circuit. Then, the photo-electronic sensing module repeatedly captures the G data, the R data, and the B data at each pixel in a next row. The scanning process is one of two types: a one-channel scanning process or a three-channel scanning process. A one-channel scanning process captures and generates only one kind of color data (R data, G data, or B data) for each pixel at any one time. A three-channel scanning process captures and generates all color data (R data, G data, and B data) for each pixel at any one time. Obviously, the three-channel scanning process is faster than the one-channel scanning process. The present invention can be applied to both one-channel and three-channel scanning processes. The two scanning processes are well known by those skilled in the art, and their detailed operations are not described herein.

FIGS. 1A and 1B can be applied to both one-channel and three-channel scanning processes. FIG. 1A shows how the prior art selects initial scanning positions and scanning areas for each color data. In FIG. 1A, each cell.represents a pixel in a row, and a number thereof indicates the pixel location on the row. In the following description, a symbol P(m, n) (m, n≧1) presents a pixel value, wherein "m" and "n" are respectively a row coordinate value and a column coordinate value of the pixel.

In the prior art, when some row, e.g., a (2n−1)th row, is scanned, the initial scanning positions of the three color data are all at the first pixel, and the scanning areas thereof comprise an entire row. The resolution of the three-color data is defined together.

FIG. 1B shows the color data contained in each pixel in FIG. 1A. In FIG. 1B, R(m, n), G(m, n) and B(m, n), respectively represent the R data, G data, and B data of the pixel value P(m, n). If one-color data is represented by 8 bits, each pixel value P(m, n) includes 3×8=24 bits. From FIGS. 1A and 1B, it is known that the conventional scanning process transmits all color data (24 bits) each pixel value to the PC.

The bottleneck of the transmission rate in the prior art scanning device or MFP occurs while transmitting color data to the PC. Compressing image data transmitted to the PC is a preferred method to improve the transmission rate.

According to the characteristics of the scanning device of an MFP, an ideal data compression/decompression method must meet the following two requirements.

(1) Fixed Compression Rate:

In the prior art data compression method of the scanning device of an MFP, the simpler the figures to be scanned, the better the compression rate and the lower bit requirement, and vice versa. Generally, simple figures and complex figures are often mixed in the figures to be scanned. When large image data from complex figure is received by a PC, the PC takes more time to receive the large image data, and the processing rate of the PC decreases. Therefore, the scanning rate of the scanner must decrease to meet the slower processing rate of the PC. In the prior art, decreasing the scanning rate is achieved by moving the photo-electronic sensing module at a slower rate. During the slower movement of the sensing module, in order to prevent some image data from being lost, the sensing module has to move backward. The backward movement of the sensing module has an adverse effect on the scanning quality and the scanning rate. Therefore, in the scanner, a data compression method with a fixed compression rate is preferred.

(2) Low Computation Complexity:

The compressed image data is reversed by a decompression method for sequential processing. If the decompression method is too complicated, data decompressing will take a long time. If so, a longer decompression time also makes the whole scanning/processing rate decrease.

SUMMARY OF THE INVENTION

It is therefore an object of the invention to provide an improved and simplified image data compression/ decompression method and device. The image data compression/decompression methods of the present invention meet fixed compression rate and low computation complexity requirements.

The invention achieves the above-identified objects by providing a method for compressing and decompressing data.

According to the object of the invention, an image data compressing method is provided for compressing input image data having pixel values P(m, n) arranged in M rows×N columns, wherein m is defined as a row coordinate value (m=1~M) and n is defined as a column coordinate value (n=1~N), each pixel value P(m, n) including first color data C1(m, n), second color data C2(m, n), and third color data C3(m, n).

According to a first aspect of the object, the method includes producing C1(m, n) for all m and n; producing C2(m, n) for odd m and even n; and producing C3(m, n) for even m and odd n. The compression rate is fixed at 50% by applying the present invention. The method may further includes producing C3(m, n) for odd m and odd n; and producing C2(m, n) for even m and even n. According to the latter method, the compression rate is fixed at 66%.

According to another aspect of the object, the method includes producing C1(m, n) for all m and n; producing C2(m, n) for odd m and odd n; and producing C3(m, n) for even m and even n. The method may further includes producing C3(m, n) for odd m and even n; and producing C2(m, n) for even m and odd n. According to another aspect of the object, the method includes producing C1(m, n) for all m and n; producing C2(m, n) for odd m and odd n; and producing C3(m, n) for even m and odd n. The method may further includes producing C3(m, n) for odd m and odd n; and producing C2(m, n) for even m and odd n. According to another aspect of the object, the method includes producing C1(m, n) for all m and n; producing C2(m, n) for odd m and even n; and producing C3(m, n) for even m and even n. The method may further includes producing C3(m, n) for odd m and even n; and producing C2(m, n) for even m and even n.

The compressed image data includes: (1) compressed first color data $C_{old}(m, n)$, for any m and n; (2) compressed second color data $C2_{old}(m, n)$, for odd m and n; and (3) compressed third color data $C3_{old}(m, n)$, for even m and n. According to the method of this embodiment, decompressed image data is generated, including at least one of decompressed second color data $C2_{new}(m, n)$ and decompressed third color data $C3_{new}(m, n)$ for each pixel value P(m, n). The method includes generating $C2_{new}(m, n)$ and $C3_{new}(m, n)$ of the pixel value P(m, n) according to an average value of some predetermined surrounding pixels, $C1_{old}(m, n)$, $C2_{old}(m, n)$, and $C3_{old}(m, n)$, by the following functions:

$C2_{new}(m, n)=C1_{old}(m, n)+Avg(C2_{sur}-C1_{sur})$; and
$C3_{new}(m, n)=C1_{old}(m, n)+Avg(C3_{sur}-C1_{sur})$.

The above mentioned $Avg(C2_{sur}-C1_{sur})$ is an average value of $C2_{old}(m, n)$ minus $C1_{old}(m, n)$ of some predetermined surrounding pixels. Similarly, the above mentioned $Avg(C3_{sur-C1sur})$ is an average value of $C3_{old}(m, n)$ minus $C1_{old}(m, n)$ of some predetermined surrounding pixels. In addition, the function $Avg(C2_{sur}-C1_{sur})$ and $Avg(C3_{sur}-C1_{sur})$ can be substituted by $WS(C2_{sur}-C1_{sur})$ and $WS(C3_{sur}-C1_{sur})$ respectively, wherein $WS(C2_{sur}-C1_{sur})$ is a weighted sum of $C2_{old}$ data minus $C1_{old}$ data of some predetermined surrounding pixels; and $WS(C3_{sur}-C1_{sur})$ is a weighted sum of $C3_{old}$ data minus $C1_{old}$ data of some predetermined surrounding pixels.

According to the object of the invention, an image data compression device is provided, for providing compressed image data to a host machine. The image data compression device includes a photo-electronic sensing module, for capturing a plurality of pixel values corresponding to input image data, wherein each pixel value includes first color data, second color data, and third color data, arranged in rows; and a signal converting/processing unit, for receiving the plurality of pixel values and generating the compressed image data based on the received pixel values such that the compressed image data is arranged in alternating rows of two types, wherein the first type includes all of the first color data and part of the second color data, and the second type includes all of the first color data and part of the third color data. The photo-electronic sensing module may be a charge-coupled device or a contact image sensor. The signal converting/processing unit may include an analog/digital converter, for converting the pixel values from analog form to digital form; and a digital-signal processing unit, for receiving the pixel values in digital form and generating the compressed image data. The image data compression device may also include a scanning control unit, for providing a control signal to the signal converting/processing unit; an output buffer, for receiving the compressed image data from the signal converting/processing unit; and an interface, connecting the output buffer and the host machine. The host machine may be a personal computer. The part of the second color data of the first type row may include second color data of a first pixel of each first type row and of each alternating pixel of each first type row, or may include second color data of a second pixel of each first type row and of each alternating pixel of each first type row. Likewise, the part of the third color data of the second type row may include third color data of a first pixel of each second type row and of each alternating pixel of each second type row, or may include third color data of a second pixel of each second type row and of each alternating pixel of each second type row.

According to the object of the invention, an image data compression device is provided, for providing a compressed image data to a host machine. The image data compression device includes a photo-electronic sensing module, for capturing a plurality of pixel values corresponding to input image data, wherein each pixel value comprises first color data, second color data, and third color data, arranged in rows; a signal converting/processing unit, for receiving the plurality of pixel values and providing an output corresponding to the pixel values; and a compression control unit, for receiving the output from the signal converting/processing unit, and generating the compressed image data based on the received pixel values such that the compressed image data is arranged in alternating rows of two types, wherein the first type comprises all of the first color data and part of the second color data, and the second type comprises all of the first color data and part of the third color data. The photo-electronic sensing module may be a charge-coupled device or a contact image sensor. The signal converting/processing unit may include an analog/digital converter, for converting the pixel values from analog form to digital form; and a digital-signal processing unit, for receiving the pixel values in digital form and providing a digital output corresponding to the pixel values. The image data compression device may also include an output buffer, for receiving the compressed image data from the compression control unit; and an interface connecting the output buffer and the host machine. The host machine may be a personal computer. The part of the second color data of the first type row may include second color data of a first pixel of each first type row and of each alternating pixel of each first type row, or may include second color data of a second pixel of each first type row and of each alternating pixel of each first type row. Likewise, the part of the third color data of the second type row may include third color data of a first pixel of each second type row and of each alternating pixel of each second type row, or may include third color data of a second pixel of each second type row and of each alternating pixel of each second type row.

In all of the above-described statement, the first color data is green data, the second color data is blue data, and the third color data is red data; or the first color data is green data, the second color data is red data, and the third color data is blue data; or the first color data is yellow data, the second color data is cyan data, and the third color data is magenta data; or the first color data is yellow data, the second color data is magenta data, and the third color data is cyan data.

BRIEF DESCRIPTION OF THE DRAWINGS

Other objects, features, and advantages of the invention will become apparent from the following detailed description of the preferred but non-limiting embodiments. The description is made with reference to the accompanying drawings, in which:

FIG. 1A shows initial scanning positions and scanning areas of each color data according to the prior art;

FIG. 1B shows the color data contained in each pixel in FIG. 1A;

FIG. 2A shows initial scanning positions and scanning areas for each color data according to one example of a preferred embodiment the present invention;

FIG. 2B shows the color data contained in each pixel in FIG. 2A;

FIG. 3A shows initial scanning positions and scanning areas for each color data according to another exemplary embodiment;

FIG. 3B shows the color data contained in each pixel in FIG. 3A;

FIG. 6A shows initial scanning positions and scanning areas for each color data according to still another exemplary embodiment; and FIG. 6B shows the color data contained in each pixel in FIG. 6A.

DETAILED DESCRIPTION OF THE PREFERRED EMBODIMENTS

Figure 4:
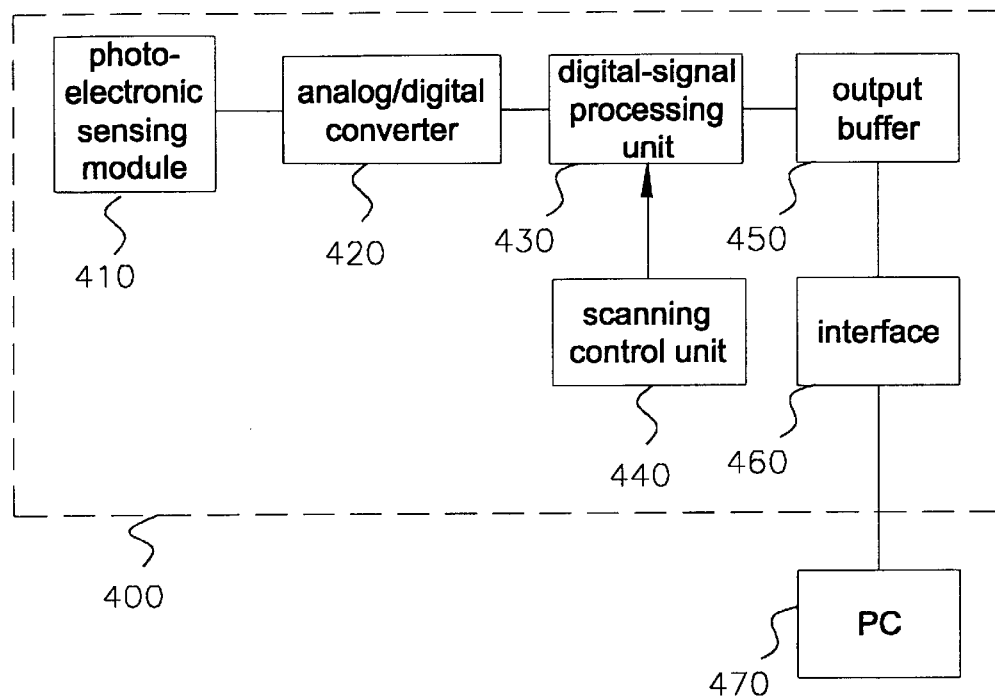
FIG. 4 shows a block diagram of a scanning device according to a preferred embodiment of the present invention.

In the present invention, image data compression is achieved by properly selecting color data of each pixel value.

Now referring to FIGS. 2A and 2B, it is assumed that selection of the G data is similar to that of the prior art. That is to say, the initial scanning position of the G data is at the first pixel of the scanning row, the scanning area thereof comprises all pixels, and the resolution thereof is one. Because, for most popular CCD or CIS, the G data has the greatest effect on image brightness, the invention therefore keeps all G data, and compresses only the B and R data instead.

When the R data of a (2n−1)th row is scanned (n is an integer), the initial position is at the second pixel, and the scanning area comprises all even pixels ($2^{nd}$, $4^{th}$, ... pixels). The resolution of the R data is thus defined as one-half.

Similarly, when the B data of a (2n)th row is scanned, the initial position is at the first pixel, and the scanning area comprises all odd pixels ($1^{st}$, $3^{rd}$, ... pixels). The resolution of the B data is therefore one-half also. In FIG. 2A, a symbol "X" indicates that the color data of the pixel is abandoned.

As shown in FIG. 2A, each pixel value selects the G data and either of the R/B data. That is to say, pixel values of the (2n−1)th row select G data in each pixel and R data in all even pixels. Similarly, pixel values of the (2n)th row select G data in each pixel and B data in all odd pixels. The selection of the (2n+1)th row, (2n+3)th row, ... etc. is the same as the (2n−1)th row. The selection of the (2n+2)th row, (2n+4)th row, ... etc. is the same as the (2n)th row.

In the present invention, the R and B data are considered as exchangeable. That is, pixel values of the (2n−1)th row, (2n+1)th row ... etc. may select G data in each pixel and B data in all even pixels. Similarly, pixel values of the (2n)th row, (2n+2)th row ... etc. may select G data in each pixel and R data in all even pixels. Further, selecting the initial position of the R data and the B data are mutually independent. The initial position of the R data is either at a first pixel or a second pixel, and so is that of the B data. The scanning area of the R data and B data can comprise all odd pixels or all even pixels independently.

FIG. 2B shows the color data contained in each pixel according to FIG. 2A. In FIG. 2B, each cell indicates a pixel.

In the present invention, each pixel value contains 3*8/2=12 bits in average. The compression rate is fixed at 12/24=50%. Because the compression rate is fixed at 50%, by applying the present invention, the scanning rate is kept constant even when a complex figure is scanned.

When the image data is compressed during the scanning process, a decompression method is required to decompress the compressed image data. Generally, the decompression is performed in a host machine, e.g., a PC. The present invention disclosures a simple decompression method, using an interpolation method, to reverse the image data.

When the image data is compressed as shown in FIG. 2B, the interpolation method of the present invention proceeds as follows. In the following description, the color data to be decompressed is designated as $R_{new}(2n-1, 2k+1)$ or $B_{new}$ (2n+1,2k+2), or is called the unknown color data, wherein n and k are both integers. The color data in the compressed image data is designated as $R_{old}(2n-1, 2k)$ or $B_{old}(2n, 2k+1)$, or is called the known color data.

The $R_{new}$ data of the (2n−1)th row is expressed as:

$$R_{new}(2n-1, 2k+1)=G_{old}(2n-1, 2k+1)+[R_{old}(2n-1, 2k)-G_{old}(2n-1, 2k)+R_{old}(2n-1, 2k+2)-G_{old}(2n-1, 2k+2)]/2 \quad \text{eq. (1)}$$

Thus, $R_{new}(2n-1, 2k+1)$ is obtained according to $G_{old}(2n-1, 2k+1)$, $R_{old}(2n-1, 2k)$, $G_{old}(2n-1, 2k)$, $R_{old}(2n-1, 2k+2)$, and $G_{old}(2n-1, 2k+2)$. In summary, the interpolation method utilizes known color data of left/right pixels to obtain the $R_{new}$ data in the (2n−1)th row.

Similarly, the $B_{new}$ data of the (2n)th row is expressed as:

$$B_{new}(2n, 2k)=G_{old}(2n, 2k)+[B_{old}(2n, 2k-1)-G_{old}(2n, 2k-1)+B_{old}(2n, 2k+1)-G_{old}(2n, 2k+1)]/2 \quad \text{eq.(2)}$$

Some of the $B_{new}$ data of the (2n−1)th row is expressed as:

$$B_{new}(2n-1, 2k+1)=G_{old}(2n-1, 2k+1)+[B_{old}(2n-2, 2k+1)G_{old}(2n-2, 2k+1)+B_{old}(2n, 2k+1)-G_{old}(2n, 2k+1)]/2 \quad \text{eq.(3)}$$

$B_{new}(2n-1, 2k+1)$ is obtained according to $G_{old}(2n-1, 2k+1)$, $B_{old}(2n-2, 2k+1)$, $G_{old}(2n-2, 2k+1)$, $B_{old}(2n, 2k+1)$, and $G_{old}(2n, 2k+1)$. In summary, the interpolation method utilizes known color data of upper/lower pixels to obtain the $B_{new}$ data in the (2n−1)th row.

Similarly, some of the $R_{new}$ data of the (2n)th row is expressed as:

$$R_{new}(2n, 2k)=G_{old}(2n, 2k)+[R_{old}(2n-1, 2k)-G_{old}(2n-1, 2k)+R_{old}(2n+1, 2k)-G_{old}(2n+1, 2k)]/2 \quad \text{eq.(4)}$$

In summary, according to eqs.(1)–(4), if there is unknown color data to be decompressed, and there are known color data in the adjacent pixels (right/left pixels or upper/lower pixels), the unknown color data is obtained according to the G data of the pixel and the known color data of the adjacent pixels.

There are some boundary conditions to be considered. The boundary conditions occur at the first row, the last row, the first column, and the last column. For example, the $B_{new}$ data of the first row is obtained from eq.(1)

$$B_{new}(1, 2k)=G_{old}(1, 2k)+[B_{old}(0, 2k)-G_{old}(0, 2k)+B_{old}(2, 2k)-G_{old}(2, 2k)]/2.$$

Because $B_{old}(0, 2k)$ and $G_{old}(0, 2k)$ don't exist, the method of the present invention supposes that $B_{old}(0, 2k)$ and $G_{old}(0, 2k)$ are the same as $B_{old}(2, 2k)$ and $G_{old}(2, 2k)$ respectively. Therefore, $B_{new}(1, 2k)$ is equal to $G_{old}(1, 2k)$. Other boundary conditions are determined similarly.

The following is a description of how to obtain unknown color data when the adjacent pixels don't have known color data of the same type.

Eq.(3) represents that $B_{new}(2n-1, 2k+1)$ is obtained from $B_{old}(2n, 2k+1)$ and $B_{old}(2n-2, 2k+1)$. But, according FIG. 2B, it is clear that $B_{old}(2n, 2k)$ and $B_{old}(2n-2, 2k)$ are unknown. $B_{new}(2n, 2k)$ and $B_{new}(2n-2, 2k)$ should be obtained using eq.(2). From eq.(2) and eq.(3), $B_{new}(2n-1, 2k)$ is expressed as:

$$B_{new}(2n-1, 2k)=G_{old}(2n-1, 2k)+[B_{old}(2n-2, 2k-1)-G_{old}(2n-2, 2k-1)+B_{old}(2n-2, 2k+1)-G_{old}(2n-2, 2k+1)+B_{old}(2n, 2k-1)-G_{old}(2n, 2k-1)+B_{old}(2n, 2k+1)-G_{old}(2n, 2k+1)]/4 \quad \text{eq. (5)}$$

From eq.(5), it is known that $B_{new}(2n-1, 2k)$ is obtained according to $G_{old}(2n-1, 2k)$, $B_{old}(2n-2, 2k-1)$, $G_{old}(2n-2, 2k-1)$, $B_{old}(2n-2, 2k+1)$, $G_{old}(2n-2, 2k+1)$, $B_{old}(2n, 2k-1)$, $G_{old}(2n, 2k-1)$, $B_{old}(2n, 2k+1)$, and $G_{old}(2n, 2k+1)$. In summary, the interpolation method utilizes known color data of right-upper, right-lower, left-upper, and left-lower pixels to obtain $B_{new}(2n-1, 2k)$. Here, $P(2n-1, 2k)$ has $P(2n, 2k+1)$ as its right-upper pixel. The right-lower, left-upper, and left-lower pixels represent similar values.

Similarly, $R_{new}(2n, 2k+1)$ is obtained using eq.(1) and eq.(4):

$$R_{new}(2n, 2k+1)=G_{old}(2n, 2k+1)+[R_{old}(2n-1, 2k)-G_{old}(2n-1, 2k)+R_{old}(2n-1, 2k+2)-G_{old}(2n-1, 2k+2)+R_{old}(2n+1, 2k)-G_{old}(2n+1, 2k)+R_{old}(2n+1, 2k+2)-G_{old}(2n+1, 2k+2)]/4 \quad \text{eq.(6)}$$

From eq.(6), it is clear that $R_{new}(2n, 2k+1)$ is obtained according to $G_{old}(2n, 2k+1)$, $R_{old}(2n-1, 2k)$, $G_{old}(2n-1, 2k)$, $R_{old}(2n-1, 2k+2)$, $G_{old}(2n-1, 2k+2)$, $R_{old}(2n+1, 2k)$, $G_{old}(2n+1, 2k)$, $R_{old}(2n+1, 2k+2)$, and $G_{old}(2n+1, 2k+2)$.

In summary, from eqs.(1)–(6), a general expression for $R_{new}$ data is:

$$R_{new}=G_{old}+\text{Avg}(R_{sur}-G_{sur}) \text{ eq.} \quad (7a)$$

Similarly, general expression for $B_{new}$ data is:

$$B_{new}=G_{old}+\text{Avg}(B_{sur}-G_{sur}) \text{ eq.} \quad (7b)$$

wherein $\text{Avg}(R_{sur}-G_{sur})$ (or $\text{Avg}(B_{sur}-G_{sur})$) is an average value of $R_{old}$ data ($B_{old}$ data) minus $G_{old}$ data of some predetermined surrounding pixels. The predetermined surrounding pixels are, for example, right/left pixels in eq.(1).

Because $\text{Avg}(R_{sur}-G_{sur})$ and $\text{Avg}(B_{sur}-G_{sur})$ of the pixel value from a single color image are almost unchanged, $R_{new}$ data and $B_{new}$ data, obtained using eqs.(1)–(7), are close to the original R data and B data. There is little distortion in scanning areas of a single color in an image. Eqs.(1)–(7) are suitable for image data compressed as shown in FIG. 2A and 2B. By applying a basic interpolation concept, eqs.(1)–(6) can be adapted for a case of exchanging R/B with B/R, or a case where the scanning area of R/B color data comprises either all even or all odd pixels. By applying the method mentioned above, the function $\text{Avg}(R_{sur}-G_{sur})$ and $\text{Avg}(B_{sur}-G_{sur})$ can be substituted by $\text{WS}(R_{sur}-G_{sur})$ and $\text{WS}(B_{sur}-G_{sur})$ respectively, wherein $\text{WS}(R_{sur}-G_{sur})$ (or $\text{WS}(B_{sur}-G_{sur})$) is a weighted sum of $R_{old}$ data ($B_{old}$ data) minus $G_{old}$ data of some predetermined surrounding pixels.

Using eqs.(1)–(6), the interpolation method of the present invention only needs a few simple addition/subtraction operations and one division operation. Therefore, the interpolation method has a low computation complexity. Of course, people skilled in this art can apply other interpolating methods such as the bi-cubic interpolation to obtain unknown color data from known color data of the surrounding pixels.

There are a total of 4 modes available for selecting the scanning areas of R and B data. In the first mode, shown in FIG. 2A, the scanning area of R data in some rows comprises all even pixels and the scanning area of B data in adjacent rows comprises all odd pixels. In the second mode, the scanning area of R data in some rows comprises all even pixels and the scanning area of B data in adjacent rows comprises all even pixels. In the third mode, the scanning area of R data in some rows comprises all odd pixels and the scanning area of B data in adjacent rows comprises all odd pixels. In the fourth mode, the scanning area of R data in some rows comprises all odd pixels and the scanning area of B data in adjacent rows comprises all even pixels.

In the second, third, and fourth modes, the procedure for obtaining unknown color data is similar to that using eqs. (1)–(6), and for simplicity, it is not described herein.

Referring to FIGS. 3A and 3B, there are another 4 modes available for selecting the scanning areas of R and B data. In the first mode as shown in FIG. 3A, the scanning areas of R data and B data in some rows respectively comprise all even pixels and all odd pixels. In the second mode, the scanning areas of R data and B data in some rows respectively comprise all even pixels and all even pixels. In the third mode, the scanning areas of R data and B data in some rows respectively comprise all odd pixels and all odd pixels. In the fourth mode, the scanning areas of R data and B data in some rows respectively comprise all odd pixels and all even pixels.

FIG. 3B shows compressed color data according to FIG. 3A. In FIG. 3B, each pixel value comprises 2-color data (G data and one of R/B data), and therefore 16 bits. The compression rate is therefore fixed at 16/24=67%. The decompression (interpolation) method for FIG. 3A and 3B is similar to that expressed in eqs.(1)–(4).

When the image data is compressed as in FIG. 2A, the compression rate is better. When the image data is compressed as in FIG. 3A, the distortion is less because there is less unknown color data.

In addition, the above decompression method is based on two adjacent pixels. In fact, based on the other compression method and plural adjacent pixels, another decompression method is formed. For example, it is supposed that R(1, n), R(2, n), R(4, n) and R(5, n) are known, and R(3, n) is unknown. R(1, n) and R(2, n) are combined as one known-color data of the previous adjacent pixel. R(4, n) and R(5, n) are combined as one known-color data of the next adjacent pixel. Therefore, according to eq.(7), $R_{new}(3, n)$ is expressed as:

$$R_{new}(3, n)=G_{old}(3, n)+1/4[R_{old}(1, n)-G_{old}(1, n)+R_{old}(2, n)-G_{old}(2, n)-R_{old}(4, n)-G_{old}(4, n)-G_{old}(4, n)+R_{old}(5, n)-G_{old}(5, n)].$$

FIG. 4 shows a block diagram of a scanning device 400 according to an exemplary embodiment of the present invention. The scanning device 400 is operated in the one-channel scanning mode. The scanning device 400 includes a photo-electronic sensing module 410, an analog/digital converter (ADC) 420, a digital-signal processing unit 430, a scanning control unit 440, an output buffer 450, and an interface 460.

The photo-electronic sensing module 410 includes at least a photo sensor. The photo sensor is, for example, a charge coupled device (CCD) or a contact image sensor (CIS). When scanning a row of image data, first the photo-electronic sensing module 410 captures and converts the image data into one of the three-color data and forwards the color data to the ADC 420. Then, the photo-electronic sensing module 410 captures and converts the image data into another color data and forwards that color data to the ADC 420. Finally, the photo-electronic sensing module 410 captures and converts the image data into the third color data and forwards the color data to the ADC 420.

When an output from the photo-electronic sensing module 410 is received by the analog/digital converter 420, it is converted into a digital signal by the ADC 420. The digital signal from the ADC is provided to the digital-signal processing unit 430.

The digital-signal processing unit 430 receives a control signal from the scanning control unit 440. The control signal controls and sets the scanning areas, the resolution, and the initial scanning positions of R/G/B data. In other words, the image data compression is performed in the digital-signal processing unit 430. The scanning areas, the resolution and the initial scanning positions of R/G/B data are determined as described above.

The ADC 420 and the digital-signal processing unit 430 may be integrated as an analog/digital-signal processing unit.

The output signal from the digital-signal processing unit 430 is provided to the output buffer 450. The output from the output buffer 450 is provided to a host machine 470 through the interface 460. The host machine is, for example, a PC or other data processor. The above interpolation method for decompressing the compressed image data is executed in the PC 470. The decompression method as generally described above is implemented in exemplary form using eqs. (1)–(6), but the general method is not limited by eqs. (1)–(6).

Using the scanning device 400, the image data is compressed as shown in FIG. 2A or 3A; and the compressed data is decompressed in the host machine 470.

Figure 5:
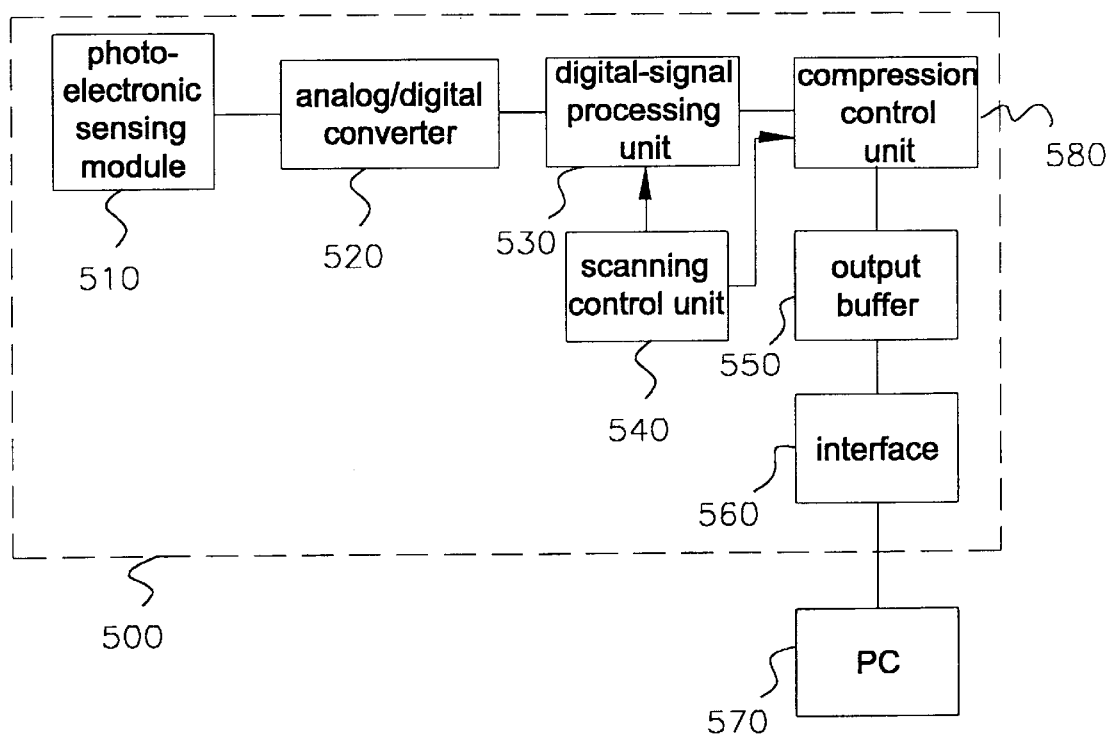
FIG. 5 shows a block diagram of another scanning device according to a preferred embodiment of the present invention.

FIG. 5 shows a block diagram of another scanning device 500 according to an exemplary embodiment of the present invention. The scanning device 500 is operated in the three-channel scanning mode. There are no differences in the scanning areas, the resolution, and the initial scanning positions of R/G/B data between the one-channel scanning mode and the three-channel scanning mode.

The scanning device 500 includes a photo-electronic sensing module 510, an analog/digital converter (ADC) 520, a digital-signal processing unit 530, a scanning control unit 540, a compression control unit 580, an output buffer 550, and an interface 560.

The photo-electronic sensing module 510 includes at least a photo sensor, for example, a charge coupled device (CCD) or a contact image sensor (CIS). The photoelectronic sensing module 510 captures and converts the image data into three-color data (R data, G data, and B data) and forwards the three-color data to the ADC 520 at one time.

The three-color data is converted into a digital signal by the analog/digital converter 520. The signal from the analog/digital converter 520 is provided to the digital-signal processing unit 530. The digital-signal processing unit 530 receives a control signal from the scanning control unit 540. Namely, the digital-signal processing unit 530 performs a digital-signal processing (DSP) on an output from the analog/digital converter 520. The control signal provides the same information and finction as that of the scanning device 400 shown in FIG. 4. The analog/digital converter 520 and the digital-signal processing unit 530 may be integrated as an analog/digital-signal processing unit.

The output signal from the digital-signal processing unit 530 is provided to the compression control unit 580. The compression control unit 580 further receives a control signal from the scanning control unit 540. Namely, the compression control unit 580 decides how to select and compress the image data. The image data can be compressed as shown in FIG. 2A or 3A. In other words, the compression operation is performed in the compression control unit 580. The output signal from the compression control unit 580 is provided to a host machine 570 through the output buffer 550 and the interface 560. The host machine 570 is, for example, a PC or other data processing device. The decompression operation is performed in the PC 570. The decompression method as generally described above is implemented in exemplary form using eqs. (1)–(6), but the general method is not limited by eqs. (1)–(6).

Using the scanning device 500, the image data is compressed as shown in FIG. 2A or 3A.

It is important to note that the division of the image data is not limited to R data, G data, and B data. Rather, the image data can be divided into Cyan (C) data, Magenta (M) data, and Yellow (Y) data. Alternatively, the image data can be expressed by color coordinate values (x, y, z).

The present invention may be applied to a scanning device (e.g., a scanner or a fax machine), or an MFP.

One advantage of the present invention is that it enables control of the scanning areas of the color data to achieve a fixed compression rate and to improve the overall scanning procession rate. The compression rate is fixed at 50% or 67%. The compressed image data is decompressed by a PC or other data processor. Due to the fixed compression rate, the scanning rate remains constant even when processing a complex image. The scanning effect works well when scanning a single color image. If necessary, the scanning device of the present invention can scan only a portion of the scanned document, rather than the entire document.

Another advantage of the present invention is that it improves the entire scanning process by applying a simple decompression method. The decompression method only requires a few addition operations, a few subtraction operations, and one division operation.

Within the spirit and scope of the present invention, people skilled in this field may contemplate various modifications. For example, the scanning areas can be selected as shown in FIG. 6A. When a (2n−1)th row is scanned, the scanning areas of G data and R data both include all pixels. When a (2n)th row is scanned, the scanning areas of G data and B data both include all pixels. Of course, R and B are interchangeable.

FIG. 6B shows the color data in each pixel according to FIG. 6A. As shown in FIG. 6B, each pixel comprises two-color data (G data and one of R/B data). The compression rate is fixed at 2/3=67%. The decompression method is similar to that expressed in eqs.(1)–(4).

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such.modifications and similar arrangements and procedures.

What is claimed is:

1. An image data compression device, for providing compressed image data to a host machine, comprising:

a photo-electronic sensing module, for capturing a plurality of pixel values corresponding to input image data, wherein each pixel value comprises a first color data, a second color data, and a third color data, arranged in rows; and a signal converting/processing unit, for receiving the pixel values and generating the compressed image data based on the received pixel values such that the compressed image data is arranged in alternating rows of a first type and a second type, wherein the first type row comprises all of the first color data and part of the second color data, and the second type row comprises all of the first color data and part of the third color data.

2. An image data compression device according to claim 1, wherein the photo-electronic sensing module is a charge-coupled device.

3. An image data compression device according to claim 1, wherein the photo-electronic sensing module is a contact image sensor.

4. An image data compression device according to claim 1, wherein the signal converting/processing unit comprises:

an analog/digital converter, for converting the pixel values from analog form to digital form; and a digital-signal processing unit, for receiving the pixel values in digital form from the analog/digital converter and generating the compressed image data.

5. An image data compression device according to claim 1, further comprising:

a scanning control unit, for providing a control signal to the signal converting/processing unit;

an output buffer, for receiving the compressed image data from the signal converting/processing unit; and an interface, connecting the output buffer and the host machine.

6. An image data compression device according to claim 1, wherein the first color data is green data; the second color data is blue data; and the third color data is red data.

7. An image data compression device according to claim 1, wherein the first color data is yellow data; the second color data is cyan data; and the third color data is magenta data.

8. An image data compression device according to claim 1, wherein the part of the second color data of the first type row includes second color data of a first pixel of each first type row and of each alternating pixel of each first type row.

9. An image data compression device according to claim 1, wherein the part of the third color data of the second type row includes third color data of a first pixel of each second type row and of each alternating pixel of each second type row.

10. An image data compression device, for providing a compressed image data to a host machine, comprising:

a photo-electronic sensing module, for capturing a plurality of pixel values corresponding to input image data, wherein each pixel value comprises first color data, second color data, and third color data, arranged in rows;

a signal converting/processing unit, for receiving the pixel values and providing an output corresponding to the pixel values; and a compression control unit, for receiving the output from the signal converting/processing unit, and generating the compressed image data based on the received pixel values such that the compressed image data is arranged in alternating rows of a first type and a second type, wherein the first type row comprises all of the first color data and part of the second color data, and the second type row comprises all of the first color data and part of the third color data.

11. An image data compression device according to claim 10, wherein the photo-electronic sensing module is a charge-coupled device.

12. An image data compression device according to claim 10, wherein the signal converting/processing unit comprises:

an analog/digital converter, for converting the pixel values from analog form to digital form; and a digital-signal processing unit, for performing a digital-signal processing on the received pixel values in digital form from the analog/digital converter.

13. An image data compression device according to claim 10, further comprising:

an output buffer, for receiving the compressed image data from the compression control unit; and an interface connecting the output buffer and the host machine.

14. An image data compression device according to claim 10, wherein the first color data is green data; the second color data is blue data; and the third color data is red data.

15. An image data compression device according to claim 10, wherein the first color data is yellow data; the second color data is cyan data; and the third color data is magenta data.

16. An image data compression device according to claim 10, wherein the part of the second color data of the first type row includes second color data of a first pixel of each first type row and of each alternating pixel of each first type row.

17. An image data compression device according to claim 10, wherein the part of the third color data of the second type row includes third color data of a first pixel of each second type row and of each alternating pixel of each second type row.

18. An image data decompressing method for decompressing compressed image data having pixel values $P(m, n)$ arranged in M rows×N columns, wherein m is defined as a row coordinate value ($m=1\sim M$) and n is defined as a column coordinate value ($n=1\sim N$), the compressed image data comprising: (1) a compressed first color data $C1_{old}(m, n)$, for any m and n; (2) a compressed second color data $C2_{old}(m, n)$, for odd m and n; and (3) a compressed third color data $C3_{old}(m, n)$, for even m and n, and for generating decompressed image data comprising at least one of decompressed second color data $C2_{new}(m, n)$ and decompressed third color data $C3_{new}(m, n)$ for each pixel value $P(m, n)$, the image data decompressing method comprising:

generating $C2_{new}(m, n)$ of the pixel value $P(m, n)$ according to $C1_{old}(m, n)$, $C2_{old}(m, n-1)$, $C1_{old}(m, n-1)$, $C2_{old}(m, n+1)$, and $C1_{old}(m, n+1)$, for odd m and even n;

generating a $C3_{new}(m, n)$ of the pixel value $P(m, n)$ according to $C1_{old}(m, n)$, $C3_{old}(m, n-1)$, $C1_{old}(m, n-1)$, $C3_{old}(m, n+1)$, and $C3_{old}(m, n+1)$ for even m and odd n;

generating $C2_{new}(m, n)$ of the pixel value $P(m, n)$ according to $C1_{old}(m, n)$, $C2_{old}(m-1, n)$, $C1_{old}(n-1, n)$, $C2_{old}(m+1, n)$, and $C1_{old}(m+1, n)$, for even m and odd n;

generating $C3_{new}(m, n)$ of the pixel value $P(m, n)$ according to $C1_{old}(m, n)$, $C3_{old}(m-1, n)$, $C1_{old}(m-1, n)$, $C3_{old}(m+1, n)$, and $C3_{old}(m+1, n)$, for odd m and even n;

generating $C2_{new}(m, n)$ of the pixel value $P(m, n)$ according to $C1_{old}(m, n)$, $C1_{old}(m-1, n-1)$, $C1_{old}(m-1, n+1)$, $C1_{old}(m+1, n-1)$, $C1_{old}(m+1, n+1)$, $C2_{old}(m-1, n-1)$, $C2_{old}(m-1, n+1)$, $C2_{old}(m+1, n-1)$, and $C2_{old}(m+1, n+1)$, for even m and n; and generating $C3_{new}(m, n)$ of the pixel value $P(m, n)$ according to $C1_{old}(m, n)$, $C1_{old}(m-1, n-1)$, $C_{old}(m-1, n+1)$, $C_{old}(m+1, n-1)$, $C1_{old}(m+1, n+1)$, $C3_{old}(m-1, n-1)$, $C3_{old}(m-1, n+1)$, $C3_{old}(m+1, n-1)$, and $C3_{old}(m+1, n+1)$, for odd m and n.

19. An image data decompression method according to claim 18, wherein the first color data is green data; the second color data is blue data; and the third color data is red data.

20. An image data decompression method according to claim 18, wherein the first color data is yellow data; the second color data is cyan data; and the third color data is magenta data.

21. An image data decompressing method for decompressing compressed image data having pixel values $P(m, n)$ arranged in M rows×N columns, wherein m is defined as row coordinate value ($m=1\sim M$) and n is defined as a column coordinate value ($n=1\sim N$), the compressed image data comprising: (1) compressed first color data $C1_{old}(m, n)$, for any m and n; (2) compressed second color data $C2_{old}(m, n)$, for odd m and n; and (3) compressed third color data $C3_{old}(m, n)$, for even m and odd n, and for generating decompressed image data comprising at least one of decompressed second color data $C2_{new}(m, n)$ and decompressed third color data $C3_{new}(m, n)$ for each pixel value $P(m, n)$, the image data decompressing method comprising:

generating $C2_{new}(m, n)$ of the pixel value $P(m, n)$ according to $C1_{old}(m, n)$, $C2_{old}(m, n-1)$, $C1_{old}(m, n-1)$, $C2_{old}(m, n+1)$, and $C1_{old}(m, n+1)$, for odd m and even n;

generating $C3_{new}(m, n)$ of the pixel value $P(m, n)$ according to $C1_{old}(m, n)$, $C3_{old}(m, n-1)$, $C1_{old}(m, n-1)$, $C3_{old}(m, n+1)$, and $C3_{old}(m, n+1)$, for even m and n;

generating $C2_{new}(m, n)$ of the pixel value $P(m, n)$ according to $C1_{old}(m, n)$, $C2_{old}(m-1, n)$, $C1_{old}(m-1, n)$, $C2_{old}(m+1, n)$, and $C1_{old}(m+1, n)$, for even m and odd n;

generating $C3_{new}(m, n)$ of the pixel value $P(m, n)$ according to $C1_{old}(m, n)$, $C3_{old}(m-1, n)$, $C1_{old}(m-1, n)$, $C3_{old}(m+1, n)$, and $C3_{old}(m+1, n)$, for odd m and n;

generating $C2_{new}(m, n)$ of the pixel value $P(m, n)$ according to $C1_{old}(m, n)$, $C1_{old}(m-1, n-1)$, $C1_{old}(m-1, n+1)$, $C_{old}(m+1, n-1)$, $C1_{old}(m+1, n+1)$, $C2_{old}(m-1, n-1)$, $C2_{old}(m-1, n+1)$, $C2_{old}(m+1, n-1)$, and $C2_{old}(m+1, n+1)$, for even m and n; and generating $C3_{new}(m, n)$ of the pixel value $P(m, n)$ according to $C1_{old}(m, n)$, $C1_{old}(m-1, n-1)$, $C1_{old}(m-1, n+1)$, $C1_{old}(m+1, n-1)$, $C1_{old}(m+1, n+1)$, $C3_{old}(m-1, n-1)$, $C3_{old}(m-1, n+1)$, $C3_{old}(m+1, n-1)$, and $C3_{old}(m+1, n+1)$, for odd m and even n.

22. An image data decompression method according to claim 21, wherein the first color data is green data; the second color data is blue data; and the third color data is red data.

23. An image data decompression method according to claim 21, wherein the first color data is yellow data; the second color data is cyan data; and the third color data is magenta data.

24. An image data compressing method, for compressing an input image data having pixel values P(m, n) arranged in M rows×N columns, wherein m is defined as a row coordinate value (m=1~M) and n is defined as a column coordinate value (n=1~N), each pixel value P(m, n) comprising a first color data C1(m, n), a second color data C2(m, n), and a third color data C3(m, n), the image data compressing method comprising:

produced C1(m, n) and C2(m, n) for odd m and n;
producing C1(m, n) for odd m and even n;
producing C1(m, n) for even m and odd n; and
producing C1(m, n) and C3(m, n) for even m and n.

25. An image data compression method according to claim 24, further comprising:

producing C3(m, n) for odd m and even n; and
producing C2(m, n) for even m and odd n.

26. An image data compression method according to claim 24, wherein the first color data is green data; the second color data is blue data; and the third color data is red data.

27. An image data compression method according to claim 24, wherein the first color data is yellow data; the second color data is cyan data; and the third color data is magenta data.

28. An image data compressing method, for compressing input image data having pixel values P(m, n) arranged in M rows×N columns, wherein m is defined as a row coordinate value (m=1~M) and n is defined as a column coordinate value (n=1~N), each pixel value P(m, n) comprising first color data C1(m, n), second color data C2(m, n), and third color data C3(m, n), the image data compressing method comprising:

producing C1(m, n) for odd m and even n;
producing C1(m, n) and C2(m, n) for odd m and n;
producing C1(m, n) and C3(m, n) for even m and odd n; and
producing C1(m, n) for even m and n.

29. An image data compression method according to claim 28, further comprising:

producing C3(m, n) for odd m and n; and
producing C2(m, n) for even m and odd n.

30. An image data compression method according to claim 28, wherein the first color data is green data; the second color data is blue data; and the third color data is red data.

31. An image data compression method according to claim 28, wherein the first color data is green data; the second color data is red data; and the third color data is blue data.

32. An image data compression method according to claim 28, wherein the first color data is yellow data; the second color data is cyan data; and the third color data is magenta data.

33. An image data compression method according to claim 28, wherein the first color data is yellow data; the second color data is magenta data; and the third color data is cyan data.

34. An image data compression method, for compressing input image data having M pixel values P(m) arranged in a row, wherein m is defined as a column coordinate value (m=1~M), each pixel value P(m) comprising a first color data C1(m) and a second color data C2(m), the image data compressing method comprising:

producing C1(m) and C2(m) for even m; and
producing C1(m) for odd m.

35. An image data compression method according to claim 34, wherein each pixel value further comprises a third color data C3(m).

36. An image data compression method according to claim 35, further comprising:

producing C3(m) for even m.

37. An image data compression method according to claim 35, further comprising:

producing C3(m) for odd m.

38. An image data compression method according to claim 35, wherein the first color data is green data; the second color data is blue data; and the third color data is red data.

39. An image data compression method, for compressing input image data having M pixel values P(m) arranged in a row, wherein m is defined as a column coordinate value (m=1~M), each pixel value P(m) comprising a first color data C1(m) and a second color data C2(m), the image data compressing method comprising:

producing C1(m) and C2(m) for odd m; and
producing C1(m) for even m.

40. An image data compression method according to claim 39, wherein each pixel value further comprises a third color data C3(m).

41. An image data compression method according to claim 40, further comprising:

producing C3(m) for odd m.

42. An image data compression method according to claim 40, further comprising:

producing C3(m) for even m.

43. An image data compression method according to claim 40, wherein the first color data is green data; the second color data is blue data; and the third color data is red data.

44. An image data decompressing method for decompressing a compressed image data having M pixel values P(m) arranged in a row, wherein m is defined as a column coordinate value (m-1~M), the compressed image data comprising: (1) a compressed first color data $C1_{old}(m)$, for any m, and (2) a compressed second color data $C2_{old}(m)$, for even m, and for generating a decompressed second color data $C2_{new}(m)$ for each pixel value P(m), for odd m, the image data decompressing method comprising:

setting two weight parameters W1 and W2, wherein W1+W2=1; and
generating $C2_{new}(m)=C1_{old}(m)+W1\times[C2_{old}(m-1)-C1_{old}(m-1)]+W2\times[C2_{old}(m+1)-C1_{old}(m+1)]$, for odd m.

45. An image data decompression method according to claim 44, wherein the compressed image data further comprises a compressed third color data $C3_{old}(m)$, for even m.

46. An image data decompression method according to claim 45, further comprising:

setting two weight parameters W3 and W4, wherein W3+W4=1; and generating $C3_{old}(m)=C1_{old}(m)+W3\times[C3_{old}(m-1)-C1_{old}(m-1)]+W4\times[C3_{old}(m+1)-C1_{old}(m+1)]$, for odd m.

47. An image data decompression method according to claim 45, wherein the first color data is green data; the second color data is blue data; and the third color data is red data.

48. An image data decompression method according to claim 44, wherein the compressed image data further comprises a compressed third color data $C3_{old}(m)$, for odd m.

49. An image data decompression method according to claim 48, further comprising:

setting two weight parameters W3 and W4, wherein W3+W4=1; and generating $C3_{new}(m)=C1_{old}(m)+W3\times[C3_{old}(m-1)-C1_{old}(m-1)]+W4\times[C3_{old}(m+1)-C1_{old}(m+1)]$, for even m.

50. An image data decompression method according to claim 48, wherein the first color data is green data; the second color data is blue data; and the third color data is red data.

51. An image data decompressing method for decompressing a compressed image data having M pixel values P(m) arranged in a row, wherein m is defined as a column coordinate value (m=1~M), the compressed image data comprising: (1) a compressed first color data $C1_{old}(m)$, for any m, and (2) a compressed second color data $C2_{old}(m)$, for odd m, and for generating decompressed a second color data $C2_{new}(m)$ for each pixel value P(m), for even m, the image data decompressing method comprising:

setting two weight parameters W1 and W2, wherein W1+W2=1; and generating $C2_{new}(m)=C1_{old}(m)+W1\times[C2_{old}(m-1)-C1_{old}(m-1)]+W2\times[C2_{old}(m+1)-C1_{old}(m+1)]$, for even m.

52. An image data decompression method according to claim 51, wherein the compressed image data further comprises a compressed third color data $C3_{old}(m)$, for even m.

53. An image data decompression method according to claim 52, further comprising:

setting two weight parameters W3 and W4, wherein W3+W4=1; and generating $C3_{new}(m)=C1_{old}(m)+W3\times[C3_{old}(m-1)-C1_{old}(m-1)]+W4\times[C3_{old}(m+1)-C1_{old}(m+1)]$, for odd m.

54. An image data decompression method according to claim 52, wherein the first color data is green data; the second color data is blue data; and the third color data is red data.

55. An image data decompression method according to claim 51, wherein the compressed image data further comprises a compressed third color data $C3_{old}(m)$, for odd m.

56. An image data decompression method according to claim 55, further comprising:

setting two weight parameters W3 and W4, wherein W3+W4=1; and generating $C3_{new}(m)=C1_{old}(m)+W3\times[C3_{old}(m-1)-C1_{old}(m-1)]+W4\times[C3_{old}(m+1)-C1_{old}(m+1)]$, for even m.

57. An image data decompression method according to claim 55, wherein the first color data is green data; the second color data is blue data; and the third color data red data.

58. An image data compressing method, for compressing input image data having pixel values P(m, n) arranged in M rows×N columns, wherein m is defined as a row coordinate value (m=1~M) and n is defined as a column coordinate value (n=1~N), each pixel value P(m, n) comprising a compressed first color data C1(m, n), a compressed second color data C2(m, n), and a compressed third color data C3(m, n), the image data compressing method comprising:

producing C1(m, n) and C2(m, n), for odd m; and producing C1(m, n) and C3(m, n), for even m.

59. An image data compression method according to claim 58, wherein the first color data is green data; the second color data is blue data; and the third color data is red data.

60. An image data compression method according to claim 58, wherein the first color data is green data; the second color data is red data; and the third color data is blue data.

61. An image data compression method according to claim 58, wherein the first color data is yellow data; the second color data is cyan data; and the third color data is magenta data.

62. An image data compression method according to claim 58, wherein the first color data is yellow data; the second color data is magenta data; and the third color data is cyan data.

* * * * *